(12) United States Patent
Su

(10) Patent No.: US 8,708,119 B2
(45) Date of Patent: Apr. 29, 2014

(54) POWER TOOL

(75) Inventor: San-Yih Su, Taichung (TW)

(73) Assignee: Basso Industry Corp., Taichung (TW)

( * ) Notice: Subject to any disclaimer, the term of this patent is extended or adjusted under 35 U.S.C. 154(b) by 80 days.

(21) Appl. No.: 13/609,265

(22) Filed: Sep. 11, 2012

(65) Prior Publication Data

US 2014/0069760 A1 Mar. 13, 2014

(51) Int. Cl.
*F16D 11/06* (2006.01)

(52) U.S. Cl.
USPC ........................................... 192/43.1

(58) Field of Classification Search
USPC ............. 192/43.1, 43, 41 R, 31, 30 R, 110 R, 192/45.1, 46, 41 S, 41 A
See application file for complete search history.

(56) References Cited

U.S. PATENT DOCUMENTS

| | | |
|---|---|---|
| 5,535,646 A | 7/1996 | Allen et al. |
| 5,622,089 A * | 4/1997 | Gifford, Sr. .................. 81/62 |
| 6,640,669 B2 * | 11/2003 | Izumisawa ................... 81/57.39 |
| 2003/0150298 A1 | 8/2003 | Kusama |
| 2008/0142329 A1 | 6/2008 | Kobayashi |

FOREIGN PATENT DOCUMENTS

TW 1370043 B1 8/2012

* cited by examiner

*Primary Examiner* — David D Le
*Assistant Examiner* — David J Hlavka
(74) *Attorney, Agent, or Firm* — CKC & Partners Co., Ltd.

(57) ABSTRACT

A reciprocal switching structure of a ratchet wrench is provided and includes a case, a gear assembly, two gear racks, a reciprocal switching mechanism, and a transmission unit. The case has a first end and a second end, wherein the second end is adjacent to a gripping part of the ratchet wrench and is opposite to the first end. The gear assembly is pivotally disposed in the case. The two gear racks engage or disengage from the gear assembly reciprocally. The reciprocal switching mechanism is disposed in the case and includes two push rods and at least one reciprocal switching member. The transmission unit pivotally is disposed in the case, and is pivotally connected between the two gear racks for driving the two gear racks to be displaced.

16 Claims, 8 Drawing Sheets

POWER TOOL

BACKGROUND

1. Field of Invention

This invention relates to a light and portable power tool. More particularly, this invention relates to a ratchet wrench power tool.

2. Description of Related Art

Hand-held tools, which are operated using gas power, electric power or another type of power, are necessarily light and portable. As to different types of operation, linear displacement and rotational operation are two common ways in which hand-held tools operate. A hand-held power tool utilizing a rotational type of operation is often used for fastening workpieces such as screws and nuts, and is also frequently used for drilling. However, regardless of the purpose to which the power tool is applied, the power tool has must be able to switch between forward and reverse rotation.

Conventionally, the switching means for executing the function of switching between forward and reverse rotation is at a distance from the operator's hand. U.S. Pat. No. 5,535,646 and U.S. Pat. No. 6,640,669 involve configurations that attempt to shift the switching means for executing the function of switching between forward and reverse rotation toward the operator's hand. With respect to U.S. Pat. No. 5,535,646, as a result of the inner structural positioning used therein, the switching means is not shifted to a sufficient enough degree toward the operator's hand. As to U.S. Pat. No. 6,640,669, a more complex and a larger tool results due to the configuration used therein.

SUMMARY

An aspect of the present disclosure is to provide a reciprocal switching structure of a ratchet wrench which uses a push rod adjacent to a gripping part of the ratchet wrench to push one of two gear racks away from a gear assembly such that the gear assembly is engaged with only one gear rack at a time, thereby controlling the rotation direction of the gear assembly.

According to one embodiment of the present disclosure, a reciprocal switching structure of a ratchet wrench includes a case, a gear assembly, two gear racks, a reciprocal switching mechanism and a transmission mechanism. The case has a first end and a second end, and the second end is adjacent to a gripping part of the ratchet wrench and is opposite to the first end. The gear assembly is pivotally disposed in the case. The two gear racks are engaged or disengaged from the gear assembly reciprocally. The reciprocal switching mechanism is disposed in the case, and comprises two push rods and at least one reciprocal switching member. The two push rods are disposed in the case, wherein the two push rods are alternately displaced along a direction extending from the first end to the second end, in order to displace one of the two gear racks to be engaged or disengaged from the gear assembly. The at least one reciprocal switching member is connected between the two push rods for driving one push rod to push against one gear rack for disengaging the gear assembly and the gear rack, thereby driving the other gear rack to be engaged with the gear assembly. The transmission unit pivotally is disposed in the case, wherein the transmission unit is pivotally connected between the two gear racks for driving the two gear racks to be displaced.

According to another embodiment of the present disclosure, a power tool includes a case, a ratchet, a first gear rack, a second gear rack, an elastic member, a reciprocal switching mechanism and a transmission unit. The ratchet is pivotally disposed in the case. The first gear rack is disposed movably in the case, wherein the first gear is engaged or disengaged from the ratchet. The second gear rack is disposed movably in the case, wherein the second gear rack is disposed opposing the first gear rack and is engaged or disengaged from the ratchet in an alternating manner with the first gear rack. The elastic member is connected between the first gear rack and the second gear rack, and provides a biasing force to the first gear rack and the second gear rack in a direction toward the ratchet. The reciprocal switching mechanism comprises a first push rod and a second push rod. The first push rod is linearly and displaceably disposed in the case for pushing the first gear rack away from the ratchet, wherein the first push rod comprises a first sliding block locating at an end thereof, and the first sliding block is exposed outside of the case to allow for user manipulation of the first sliding block. The second push rod is linearly and displaceably disposed in the case for pushing the second gear rack away from the ratchet, wherein the second push rod comprises a second sliding block located at an end thereof, and the second sliding block is exposed outside of the case to allow for user manipulation of the second push rod. The transmission unit is pivotally disposed in the case, wherein the transmission unit is connected between the first gear rack and the second gear rack for driving the first gear rack and the second gear rack to be displaced reciprocally.

According to another embodiment of the present disclosure, a power tool includes a case, a ratchet, a first gear rack, a second gear rack, two elastic members, a reciprocal switching mechanism and a transmission unit. The ratchet is pivotally disposed in the case. The first gear rack is disposed movably in the case, wherein the first gear is engaged or disengaged from the ratchet. The second gear rack is disposed movably in the case, wherein the second gear rack is disposed opposing the first gear rack and is engaged or disengaged from the ratchet in an alternating manner with the first gear rack. One of the two elastic members is connected between the first gear rack and the first push rod, and the other elastic member is connected between the second gear rack and the second push rod. The reciprocal switching mechanism comprises a first push rod and a second push rod. The first push rod is linearly and displaceably disposed in the case and is abutted against the first gear rack, wherein the first push rod comprises a first sliding block locating at an end thereof, and the first sliding block is exposed outside of the case to allow for user manipulation of the first sliding block. The second push rod is linearly and displaceably disposed in the case and is abutted against the second gear rack, wherein the second push rod comprises a second sliding block located at an end thereof, and the second sliding block is exposed outside of the case to allow for user manipulation of the second push rod. The transmission unit is pivotally disposed in the case, wherein the transmission unit is connected between the first gear rack and the second gear rack for driving the first gear rack and the second gear rack to be displaced reciprocally.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2' is a schematic view showing an internal structure of a power tool according to another embodiment of the present disclosure;

DETAILED DESCRIPTION

Figure 1:
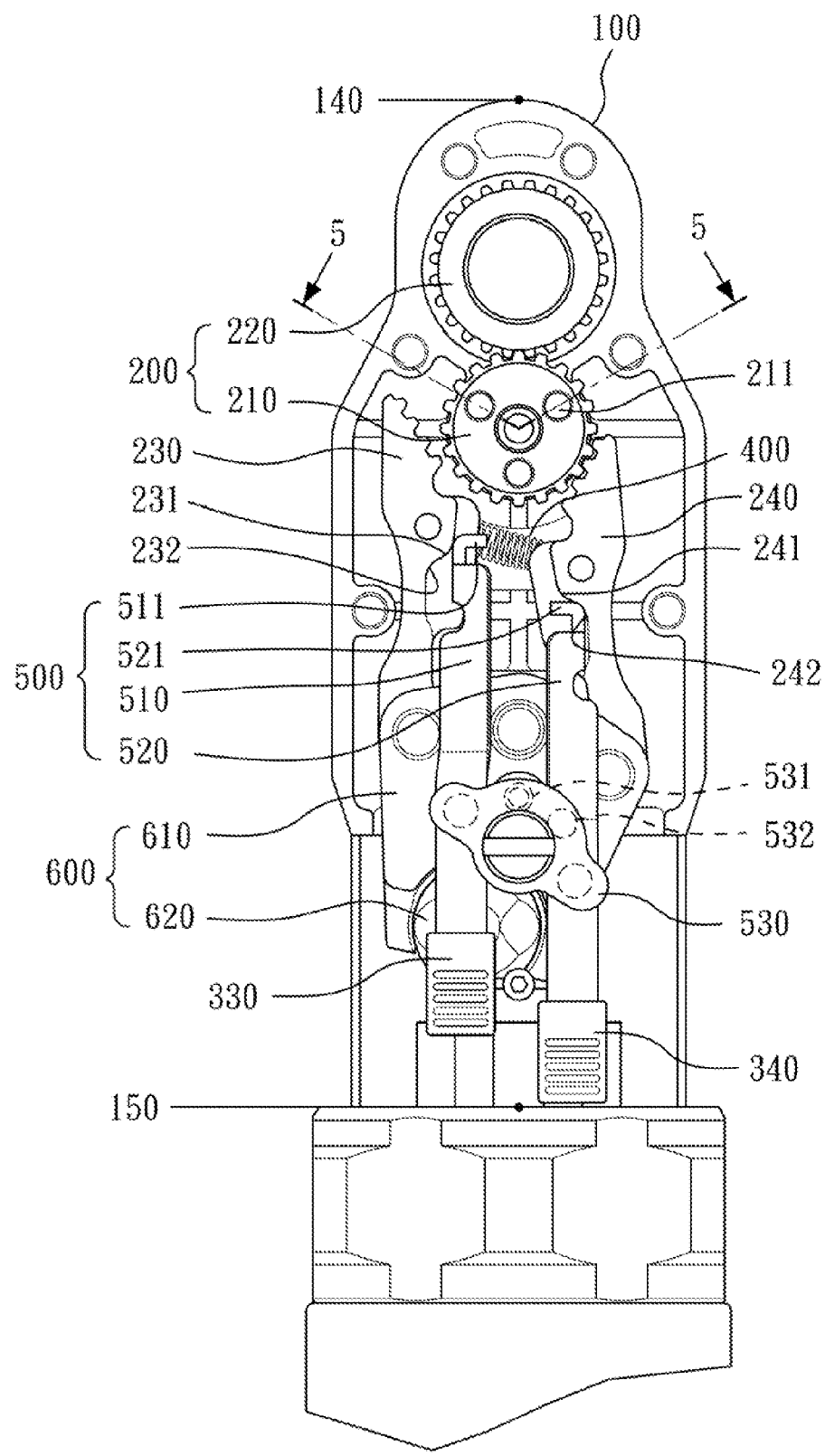
FIG. 1 is a schematic view showing an internal structure of a power tool according to an embodiment of the present disclosure.

FIG. 1 is a schematic view showing an internal structure of a power tool according to an embodiment of the present disclosure. As shown in FIG. 1, the power tool includes a case 100, a gear assembly 200, a first gear rack 230, a second gear rack 240, an elastic member 400, a reciprocal switching mechanism 500 and a transmission unit 600. The gear assembly 200 comprises a transmission gear 220 and a ratchet 210, and the ratchet 210 and the transmission gear 220 are engaged. Both of the transmission gear 220 and the ratchet 210 are pivotally disposed in the case 100, and the first gear rack 230 is disposed opposing the second gear rack 240. The reciprocal switching mechanism 500 includes a first push rod 510 and a second push rod 520. The first and second gear racks 230, 240 are disposed movably in the case 100. The first gear rack 230 is engaged with the ratchet 210 when the second gear rack 240 is disengaged from the ratchet 210 and vice versa. The elastic member 400 is connected between the first and second gear racks 230, 240, and provides a biasing force to the first gear rack 230 and the second gear rack 240 in a direction toward the ratchet 210. The first push rod 510 and the second push rod 520 can be linearly and displaceably disposed in the case 100. The first push rod 510 and the second push rod 520 respectively push against the first gear rack 230 and the second gear rack 240 to displace the same in a direction away from the ratchet 210. The transmission unit 600 is pivotally disposed in the case 100. The transmission unit 600 is connected to the first gear rack 230 and the second gear rack 240, so that the first gear rack 230 and the second gear rack 240 can be displaced in opposite directions. That is, the transmission unit 600 is pivotally connected between the first gear rack 230 and the second ear rack 240, and is provided for driving the first gear rack 230 and the second gear rack 240 to be displaced in a reciprocal manner.

A sides of the first gear rack 230 facing the second gear rack 240 and a side of the second gear rack 240 facing the first gear rack 230 are referred to as inner sides. A first flange 231 and a first guiding groove 232 can be included in the inner side of the first gear rack 230. A second flange 241 and a second guiding groove 242 can be included in the inner side of the second gear rack 240. A first guiding portion 511 is disposed at one end of the first push rod 510, and the first guiding portion 511 is alternately displaced along the first flange 231 and the first guiding groove 232 for displacing the first gear rack 230. A second guiding portion 521 is disposed at one end of the second push rod 520, and the second guiding portion 521 is alternately displaced along the second flange 241 and the second guiding groove 242 for displacing the second gear rack 240. Moreover, the case 100 can have a first rail 110 and a second rail 120 (see FIG. 6). A first sliding block 330 is disposed at the other end of the first push rod 510, and a second sliding block 340 is disposed at the other end of the second push rod 520. The first sliding block 330 is exposed outside of the first rail 110 to allow users to operate the first sliding block 330. The second sliding block 340 is exposed outside of the second rail 120 to allow users to operate the second sliding block 340. Therefore, the sliding blocks 330, 340 provided for user manipulation using a hand can be more close to the user's thumb.

The power tool further comprises reciprocal switching member 530. The reciprocal switching member 530 is pivotally disposed in the case 100 and is connected between the first push rod 510 and the second push rod 520. One end of the reciprocal switching member 530 is pivotally connected to the first push rod 510, and the other end of the reciprocal switching member 530 is pivotally connected to the second push rod 520. Through such a configuration, the reciprocal switching member 530 operates such that the first push rod 510 and the second push rod 520 can be linearly displaced in opposite directions.

Figure 2:
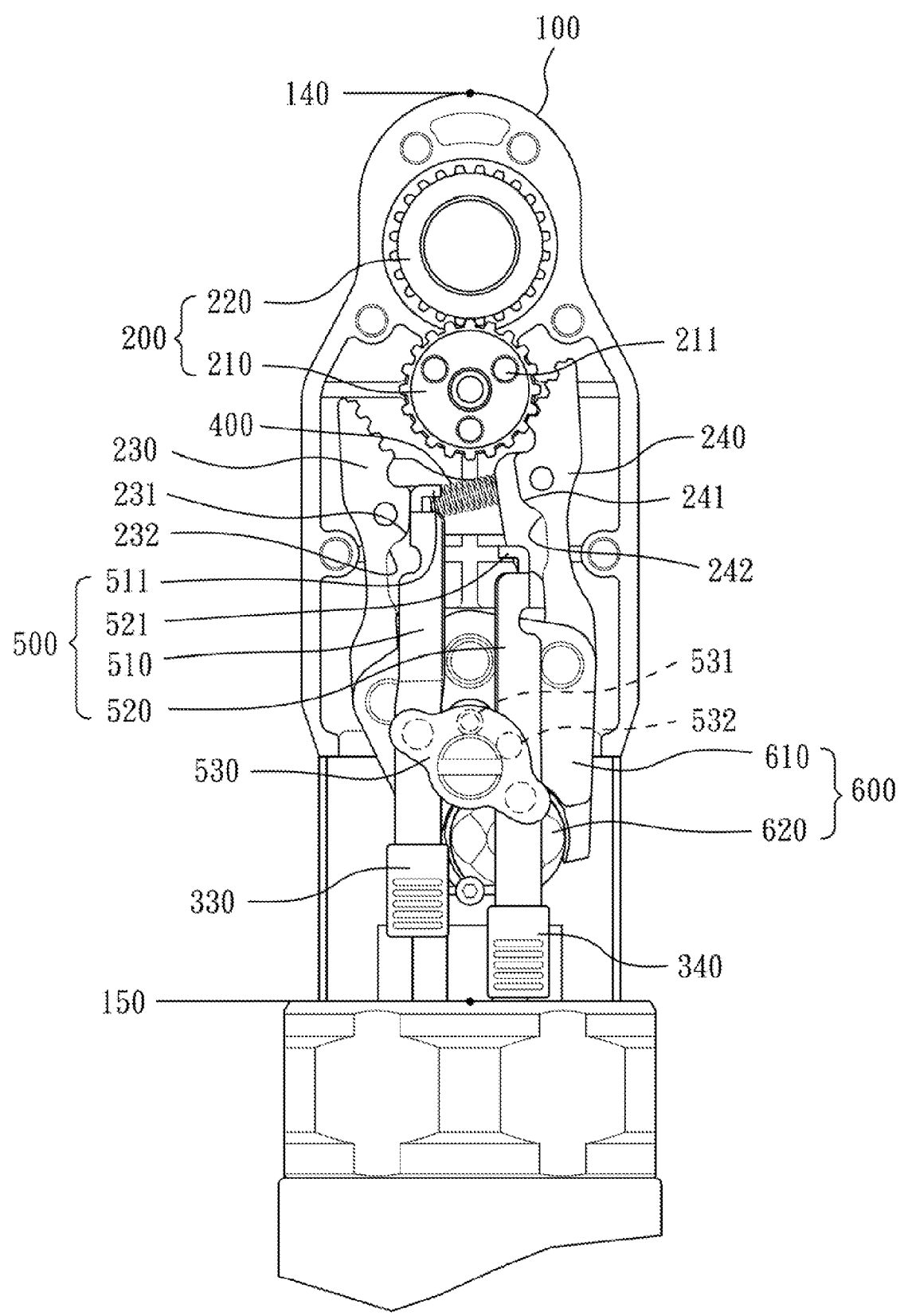
FIG. 2 is a schematic view of the power tool of FIG. 1, illustrating a second gear rack pushing and rotating a ratchet.
Figure 2:
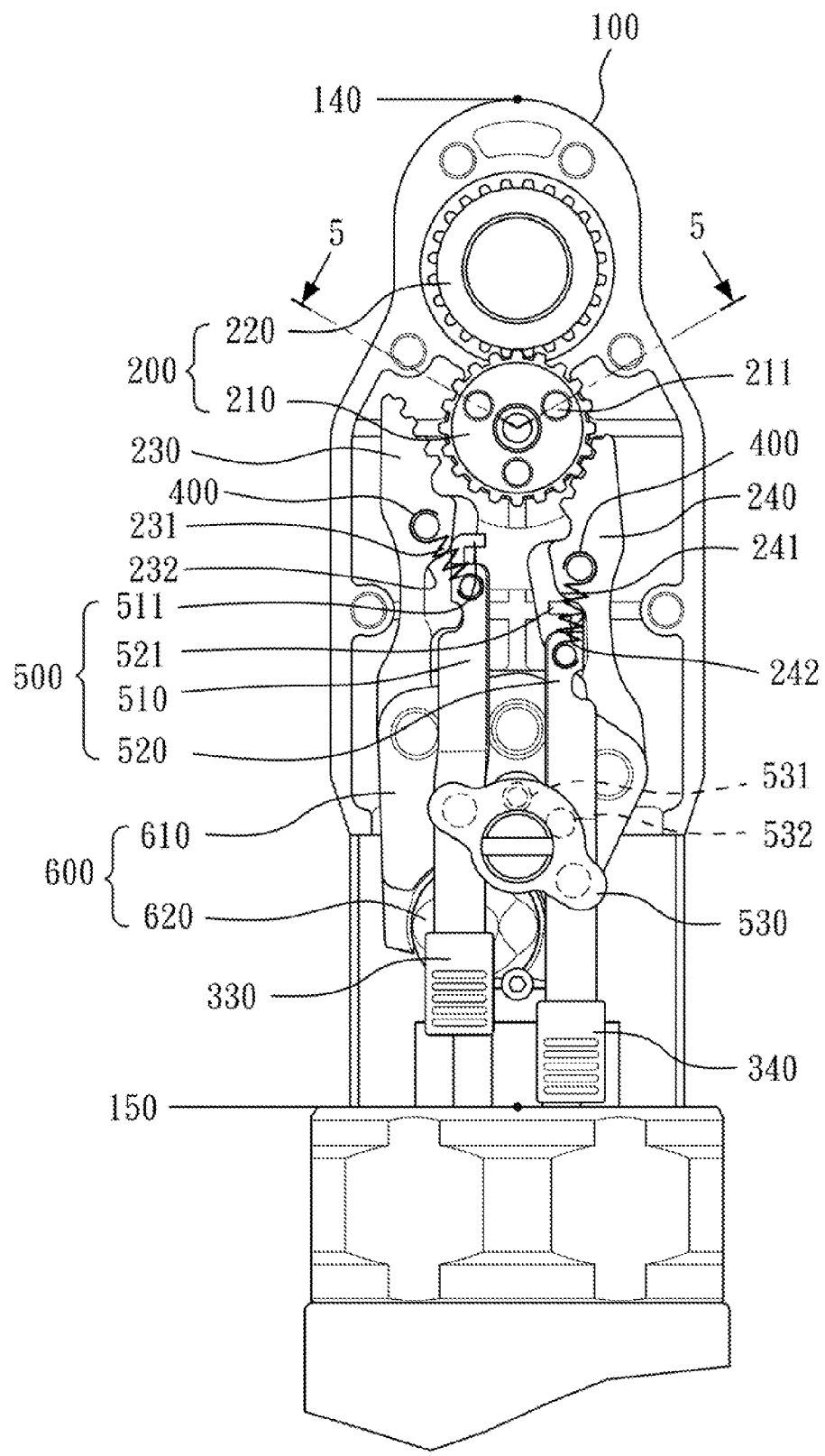

FIG. 2 is a schematic view of the power tool of FIG. 1, illustrating the second gear rack 240 pushing and rotating the ratchet 210. During operation, the elastic member 400 provides a biasing force to the first gear rack 230 and the second gear rack 240 in a direction toward the ratchet 210. The first guiding portion 511 pushes against the first flange 231 of the first gear rack 230 so as to push the first gear rack 230 away from the ratchet 210. At this time, because the elastic member 400 provides a biasing force to the second gear rack 240 in a direction toward the ratchet 210, only the second gear rack 240 is engaged with the ratchet 210. The transmission unit 600 drives the second gear rack 240 to displace along a tangent direction of the ratchet 210 for rotating the ratchet 210. While the second gear rack 240 is returned, the second gear rack 240 is disengaged from the ratchet 210 and so returns by itself (without rotating the ratchet 210). Therefore, during the returning movement of the second gear rack 240, the ratchet 210 will be rotated only in one rotational direction. As described above, the elastic member 400 is elastically connected between the first gear rack 230 and the second gear rack 240 so that the first gear rack 230 and the second gear rack 240 can be pulled toward the ratchet 210. In another embodiment, the elastic members 400 can be two and can be respectively connected between the push rods 510/520 and the gear racks 230/240 for allowing the push rods 510/520 to be abutted against the gear racks 230/240 (FIG. 2'). Furthermore, in some embodiments, the elastic member 400 may push against the outer sides of the first gear rack 230 and the second gear rack 240 so as to bias the first gear rack 230 and the second gear rack 240 in a direction toward the ratchet 210.

The elastic member 400 pulling against the first gear rack 230 and the second gear rack 240 is used as an example in the embodiment herein.

Figure 3:
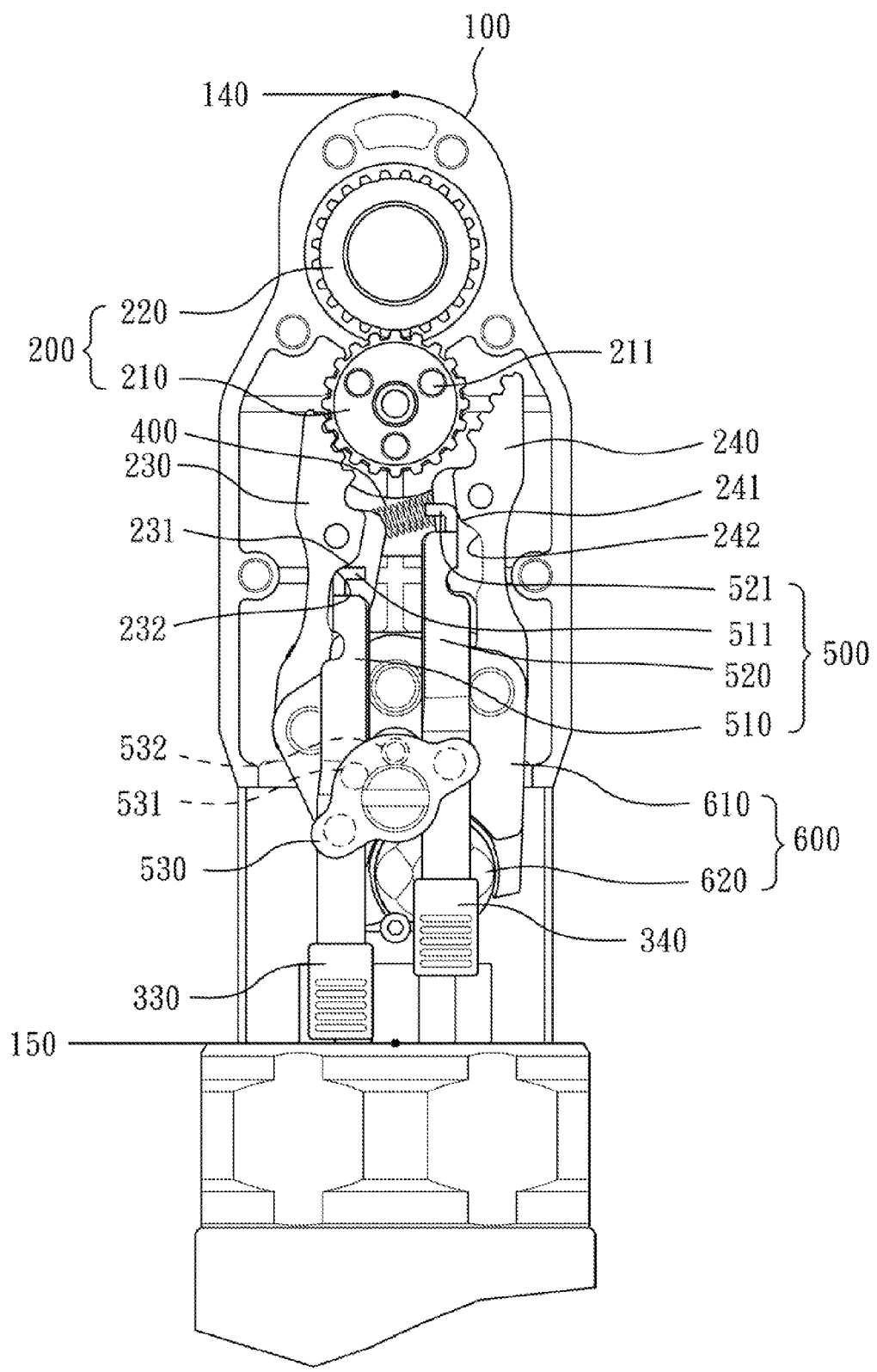
FIG. 3 is a schematic view of the power tool of FIG. 1, illustrating a first gear rack engaged with the ratchet, and the second gear rack disengaged from the ratchet.

FIG. 3 is a schematic view of the power tool of FIG. 1, illustrating the first gear rack 230 engaged with the ratchet 210 and the second gear rack disengaged from the ratchet 210. When the first sliding block 330 is pushed by a user, the first guiding portion 511 is displaced from the first flange 231 to the first guiding groove 232 of the first gear rack 230. During this process, the elastic member 400 pulls the first gear rack 230 toward the ratchet 210 so that the first gear rack 230 engages with the ratchet 210.

At the same time, the first sliding block 330 operates the reciprocal switching member 530 so that the second sliding block 340 is displaced, and the second guiding portion 521 is displaced from the second guiding groove 242 to the second flange 241 of the second gear rack 240, thereby pushing the second gear rack 240 away from the ratchet 210.

Figure 4:
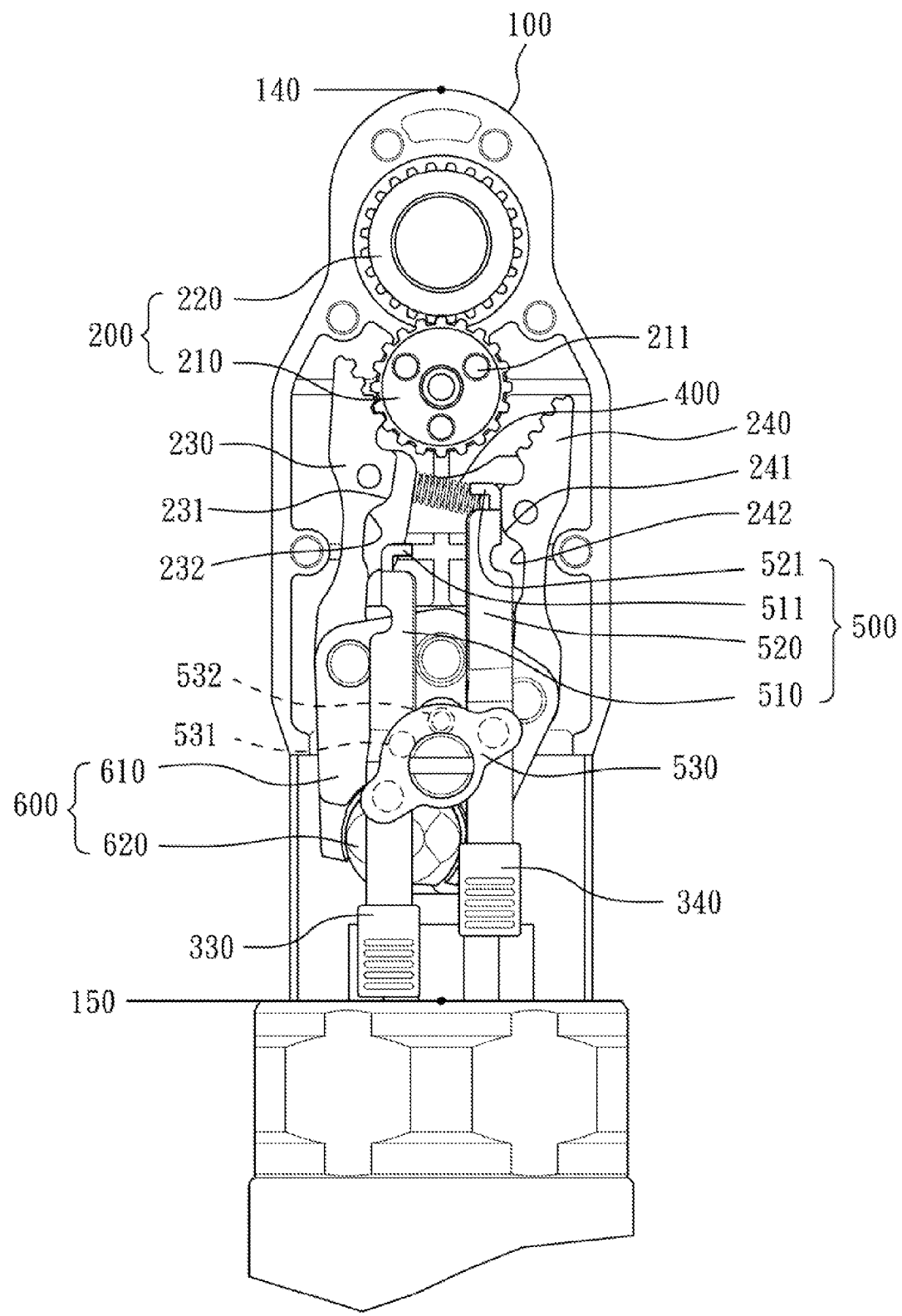
FIG. 4 is a schematic view of the power tool of FIG. 1, illustrating the first gear rack pushing and rotating the ratchet.

FIG. 4 is a schematic view of the power tool of FIG. 1, illustrating the first gear rack 230 pushing and rotating the ratchet 210. The transmission unit 600 drives the first gear rack 230 to be alternately displaced. During displacement, the ratchet 210 is pushed and rotated in another rotational direction while the first gear rack 230 displaces along the tangent direction of the ratchet 210.

During operation, the user may select one of the push rods 510 or 520 to make one of the gear racks 230 or 240 move away from the ratchet 210 so that the ratchet 210 is pushed and rotated only by one of the gear racks 230 or 240, thereby controlling the rotational direction of the ratchet 210. Also, during user manipulation, when one sliding block 330 is moved, the other sliding block 340 will be displaced by the reciprocal switching member 530, thereby changing the positions of the two push rods 510, 520 simultaneously. Hence, when holding the power tool, the user can push and move one of the sliding blocks 330 or 340 merely by using his or her thumb, thereby changing the rotational direction of the ratchet 210. As a result, it is possible to achieve the effect of switching the rotational direction using a single hand.

Figure 5:
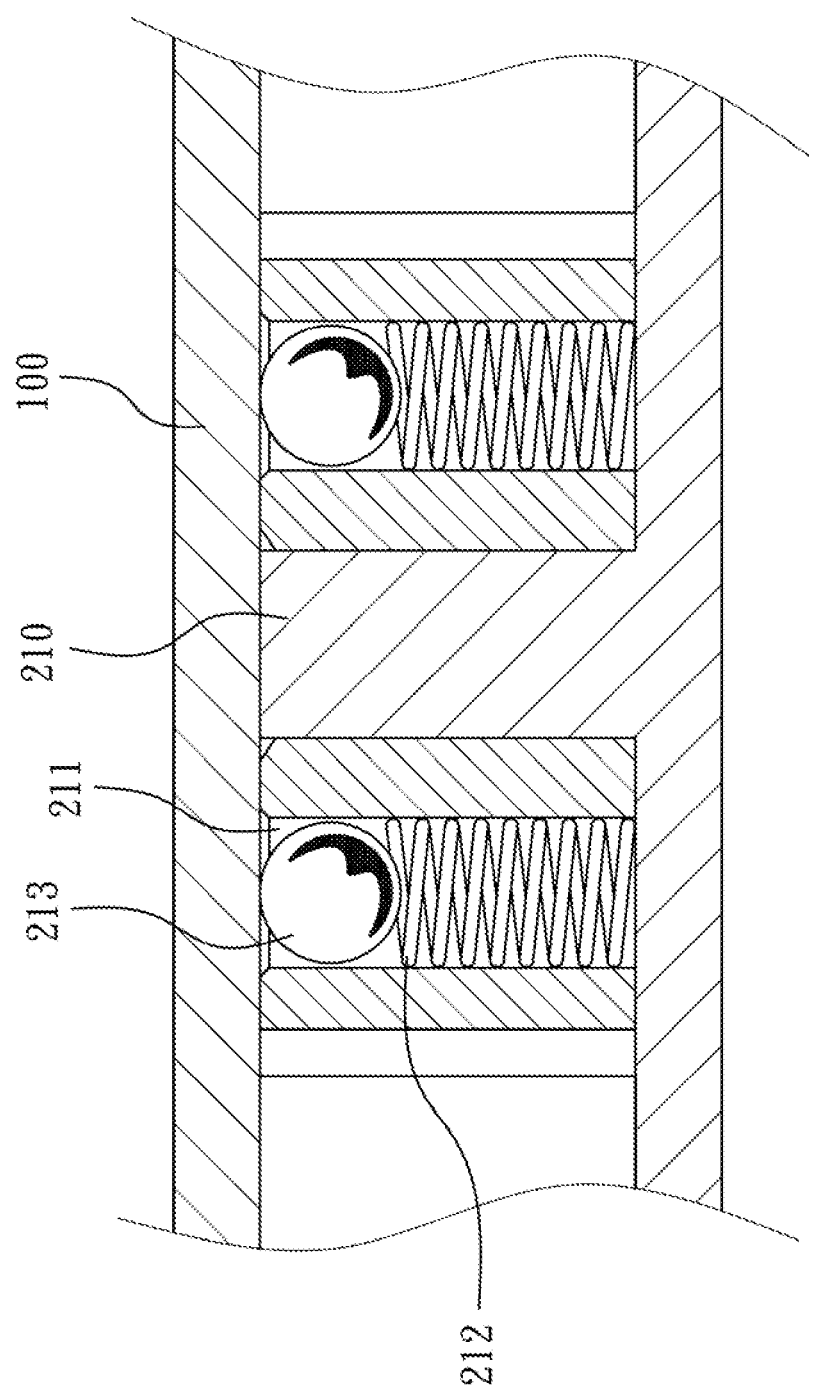
FIG. 5 is a schematic cross-sectional view taken along line 5-5 of FIG. 1.

FIG. 5 is a schematic cross-sectional view taken along line 5-5 of FIG. 1. The ratchet 210 further includes at least one blind hole 211, at least one spring 212 and at least one steel ball 213. The spring 212 and the steel ball 213 are received in the blind hole 211, such that the spring 212 pushes against and displaces the steel ball 213 outwards from the blind hole 211. When the ratchet 210 is disposed in the case 100, the steel ball 213 will be pushed by the spring 212 to abut against the case 100, thereby increasing the resistance between the ratchet 210 and the case 100. Thus, when the gear racks 230, 240 undergo a returning movement, the gear racks 230, 240 will not force the ratchet 210 to rotate backwards.

Figure 6:
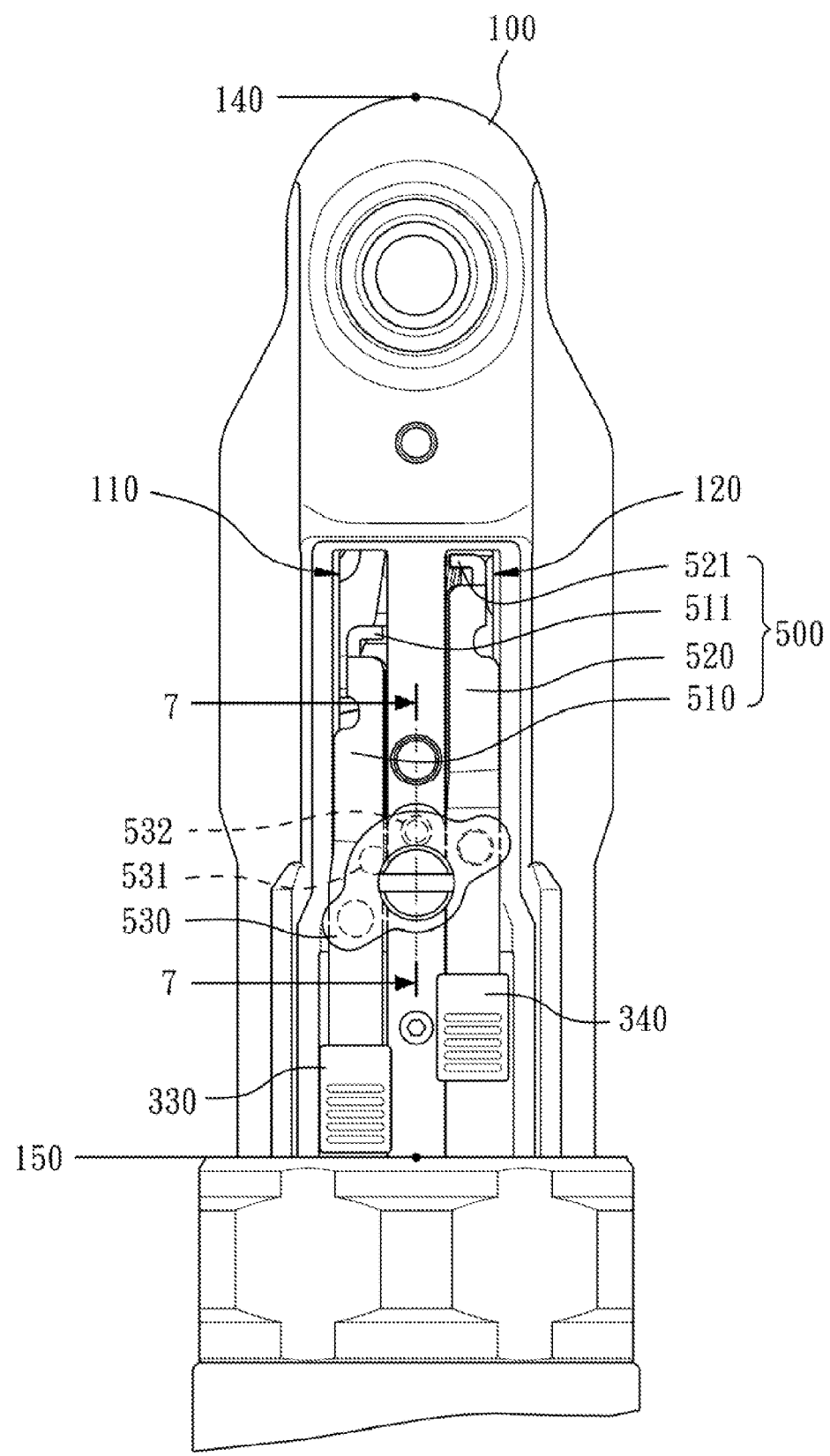
FIG. 6 is a schematic view of the power tool of FIG. 1, illustrating a reciprocal switching member pivotally disposed in a case.
Figure 7:
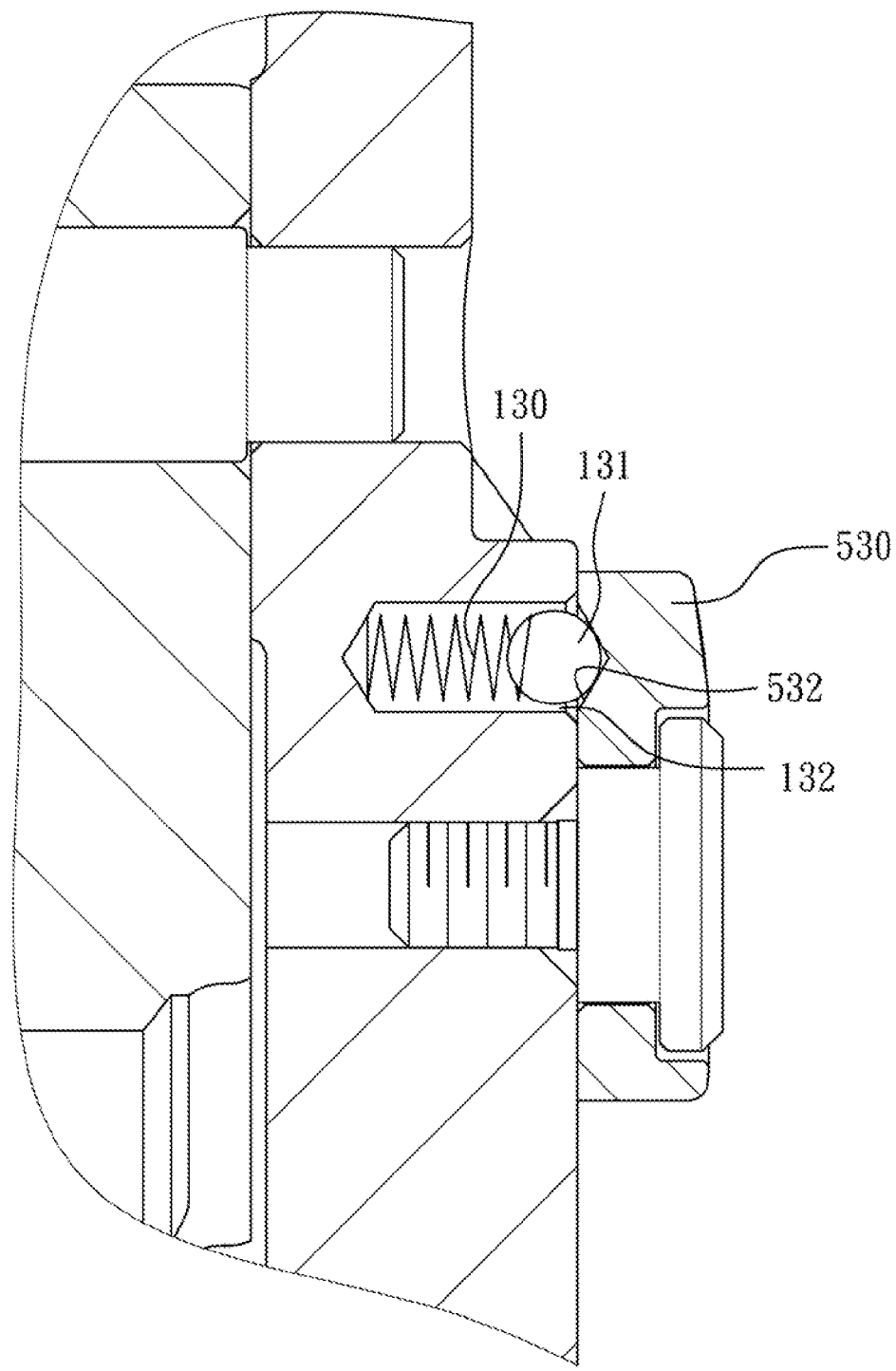
FIG. 7 is a cross-sectional view of the reciprocal switching member taken along line 7-7 of FIG. 6.

FIG. 6 is a schematic view of the power tool of FIG. 1 illustrating the reciprocal switching member 530 pivotally disposed in the case 100, and FIG. 7 is a cross-sectional view of the reciprocal switching member 530 taken along line 7-7 of FIG. 6. The case 100 includes the first rail 110 and the second rail 120 disposed thereon, as described above. The first rail 110 is provided for allowing the first push rod 510 to slide thereon, and the second rail 120 is provided for allowing the second push rod 520 to slide thereon. One of the two ends of the reciprocal switching member 530 is pivotally connected to the first push rod 510, and the other end of the reciprocal switching member 530 is pivotally connected to the second push rod 520, thereby displacing the first push rod 510 and the second push rod 520 in opposite directions when the reciprocal switching member 530 is operated. A bottom surface of the reciprocal switching member 530 includes a first indentation 531 and a second indentation 532. The case 100 includes a recess 132 located between the first push rod 510 and the second push rod 520, and a compression spring 130 is vertically disposed in the recess 132. Moreover, a bead 131 is disposed on the compression spring 130 exposing outwards from the recess 132. The compression spring 130 abuts against and displaces the head 131 outward from the recess 132, and then the bead 131 abuts against one of the two indentations 531, 532 so as position the reciprocal switching member 530 while the first rod 510 and the second rod 520 reciprocally displace.

Referring back to FIG. 1, in some embodiments, the transmission unit 600 includes a swinging member 610 and an eccentrically rotating member 620. The swinging member 610 is pivotally disposed in the case 100. Also, the swinging member 610 is connected to the first gear rack 230 and the second gear rack 240. The first gear rack 230 and the second gear rack 240 are pivotally disposed at the swinging member 610, and are respectively located at both sides of the eccentrically rotating member 620. When the eccentrically rotating member 620 is driven to be rotated, the swinging member 610 can be driven to swing reciprocally and can simultaneously bring the first gear rack 230 and the second gear rack 240 to be displaced reciprocally, in which the power source for driving the eccentrically rotating member 620 is conventional and so is not described herein.

The aforementioned ratchet 210 driven to be rotated can be used as an output power. For example, a socket (not shown) can be mounted on the ratchet 210 to release or fasten a nut (not shown). A socket driven and rotated by the ratchet 210 can achieve the same function.

It will be apparent to those skilled in the art that various modifications and variations can be made without departing from the scope or spirit of the present invention. Therefore, the scope of the present invention shall be defined by the appended claims.

What is claimed is:

1. A reciprocal switching structure of a ratchet wrench, comprising:
   a case having a first end and a second end, wherein the second end is adjacent to a gripping part of the ratchet wrench and is opposite to the first end;
   a gear assembly pivotally disposed in the case;
   two gear racks engaging or disengaging from the gear assembly reciprocally; and
   a reciprocal switching mechanism disposed in the case, comprising:
      two push rods disposed in the case, wherein the two push rods are alternately displaced along a direction extending from the first end to the second end, in order to displace one of the two gear racks to engage or disengage from the gear assembly; and
      at least one reciprocal switching member connected between the two push rods, wherein the at least one reciprocal switching member drives one push rod to push against one gear rack for disengaging the gear assembly and the gear rack, thereby driving the other gear rack to be engaged with the gear assembly; and
   a transmission unit pivotally disposed in the case, wherein the transmission unit is pivotally connected between the two gear racks for driving the two gear racks to be displaced.

2. The reciprocal switching structure of a ratchet wrench according to claim 1, wherein:
   sides of the two gear racks which are close to the gear are inner sides of the gear racks, each of the inner sides including a flange and a guiding groove; and
   a guiding portion is disposed at one end of each of the push rods, and the guiding portion is alternately displaced along the flange and the guiding groove for displacing the gear rack.

3. The reciprocal switching structure of a ratchet wrench according to claim 1, wherein the case comprises at least one rail for the push rod to slide thereon.

4. The reciprocal switching structure of a ratchet wrench according to claim 1, further comprising a sliding block arranged at one end of each of the two push rods, wherein the sliding blocks are exposed outside of the case to allow for user manipulation of the sliding blocks.

5. The reciprocal switching structure of a ratchet wrench according to claim 1, wherein the gear assembly comprises a transmission gear and a ratchet, and the ratchet and the transmission gear are engaged with each other.

6. The reciprocal switching structure of a ratchet wrench according to claim 5, wherein the two gear racks engage and disengage from the ratchet alternatingly.

7. A power tool, comprising:
a case;
a ratchet pivotally disposed in the case;
a first gear rack disposed movably in the case, wherein the first gear rack is engaged or disengaged from the ratchet;
a second gear rack disposed movably in the case, wherein the second gear rack is disposed opposing the first gear rack and is engaged or disengaged from the ratchet in an alternating manner with the first gear rack;
an elastic member connected between the first gear rack and the second gear rack, and which provides a biasing force to the first gear rack and the second gear rack in a direction toward the ratchet;
a reciprocal switching mechanism, comprising:
a first push rod linearly and displaceably disposed in the case for pushing the first gear rack away from the ratchet, wherein the first push rod comprises a first sliding block located at an end thereof, and the first sliding block is exposed outside of the case to allow for user manipulation of the first sliding block; and
a second push rod linearly and displaceably disposed in the case for pushing the second gear rack away from the ratchet, wherein the second push rod comprises a second sliding block located at an end thereof, and the second sliding block is exposed outside of the case to allow for user manipulation of the second push rod; and
a transmission unit pivotally disposed in the case, wherein the transmission unit is connected between the first gear rack and the second gear rack for driving the first gear rack and the second gear rack to be displaced reciprocally.

8. The power tool according to claim 7, wherein
a side of the first gear rack facing the second gear rack and a side of the second gear rack facing the first gear rack are inner sides, the inner side of the first gear rack includes a first flange and a first guiding groove, and the inner side of the second gear rack includes a second flange and a second guiding groove;
a first guiding portion is disposed at the other end of the first push rod, and the first guiding portion is pushably displaced along the first flange and the first guiding groove; and
a second guiding portion is disposed at the other end of the second push rod, and the second guiding portion is pushably displaced along the second flange and the second guiding groove.

9. The power tool according to claim 7, further comprising:
a reciprocal switching member pivotally connected between the first push rod and the second push rod for driving the first sliding block and the second sliding block to be displaced in opposite directions.

10. The power tool according to claim 9, wherein the reciprocal switching member is disposed in the case, one end of the reciprocal switching member is pivotally connected to the first push rod and the other end of the reciprocal switching member is pivotally connected to the second push rod, and the reciprocal switching member drives the second push rod to be displaced toward a direction while the first push rod is displaced toward an opposite direction.

11. The power tool according to claim 7, wherein the case comprises:
a first rail provided for the first push rod to slide thereon; and
a second rail provided for the second push rod to slide thereon.

12. A power tool, comprising:
a case;
a ratchet pivotally disposed in the case;
a first gear rack disposed movably in the case, wherein the first gear rack is engaged or disengaged from the ratchet;
a second gear rack disposed movably in the case, wherein the second gear rack is disposed opposing the first gear rack and is engaged or disengaged from the ratchet in an alternating manner with the first gear rack;
two elastic members, wherein one of the two elastic members is connected between the first gear rack and the first push rod, and the other elastic member is connected between the second gear rack and the second push rod;
a reciprocal switching mechanism, comprising:
a first push rod linearly and displaceably disposed in the case and abutted against the first gear rack, wherein the first push rod comprises a first sliding block located at an end thereof, and the first sliding block is exposed outside of the case to allow for user manipulation of the first sliding block; and
a second push rod linearly and displaceably disposed in the case and abutted against the second gear rack, wherein the second push rod comprises a second sliding block located at an end thereof, and the second sliding block is exposed outside of the case to allow for user manipulation of the second push rod; and
a transmission unit pivotally disposed in the case, wherein the transmission unit is connected between the first gear rack and the second gear rack for driving the first gear rack and the second gear rack to be displaced reciprocally.

13. The power tool according to claim 12, wherein
a side of the first gear rack facing the second gear rack and a side of the second gear rack facing the first gear rack are inner sides, the inner side of the first gear rack includes a first flange and a first guiding groove, and the inner side of the second gear rack includes a second flange and a second guiding groove;
a first guiding portion is disposed at the other end of the first push rod, and the first guiding portion is pushably displaced along the first flange and the first guiding groove; and
a second guiding portion is disposed at the other end of the second push rod, and the second guiding portion is pushably displaced along the second flange and the second guiding groove.

14. The power tool according to claim 12, further comprising:
a reciprocal switching member pivotally connected between the first push rod and the second push rod for driving the first sliding block and the second sliding block to be displaced in opposite directions.

15. The power tool according to claim 14, wherein the reciprocal switching member is disposed in the case, one end of the reciprocal switching member is pivotally connected to the first push rod and the other end of the reciprocal switching member is pivotally connected to the second push rod, and the reciprocal switching member drives the second push rod to be displaced toward a direction while the first push rod is displaced toward an opposite direction.

16. The power tool according to claim 12, wherein the case comprises:
   to a first rail provided for the first push rod to slide thereon; and
   a second rail provided for the second push rod to slide thereon.

\* \* \* \* \*